(12) United States Patent
Gallagher et al.

(10) Patent No.: US 8,572,951 B2
(45) Date of Patent: Nov. 5, 2013

(54) SYSTEM AND METHOD FOR REGENERATING A PARTICULATE FILTER

(75) Inventors: Shawn Michael Gallagher, Lawrence Park, PA (US); James Robert Mischler, Lawrence Park, PA (US); Luke Henry, Lawrence Park, PA (US); Stephen Mark Geyer, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 13/186,595

(22) Filed: Jul. 20, 2011

(65) Prior Publication Data

US 2011/0283682 A1 Nov. 24, 2011

Related U.S. Application Data

(63) Continuation-in-part of application No. 13/022,951, filed on Feb. 8, 2011, now Pat. No. 8,468,809, which is a continuation of application No. 11/838,296, filed on Aug. 14, 2007, now Pat. No. 7,925,431.

(51) Int. Cl.
*F01N 5/00* (2006.01)

(52) U.S. Cl.
USPC ............ 60/295; 60/273; 60/274; 60/286; 60/311; 701/19; 123/676

(58) Field of Classification Search
USPC ........... 60/273, 274, 276, 277, 284, 286, 287, 60/294, 295, 297, 298, 311; 701/1, 19, 701/201, 202, 213, 300; 123/676
See application file for complete search history.

(56) References Cited

U.S. PATENT DOCUMENTS

| | | | |
|---|---|---|---|
| 4,698,761 A | 10/1987 | Cooper et al. | |
| 5,425,338 A * | 6/1995 | Gottemoller | 123/358 |
| 5,561,602 A * | 10/1996 | Bessler et al. | 701/1 |
| 6,880,524 B2 | 4/2005 | Gates et al. | |
| 7,021,220 B2 * | 4/2006 | Harada et al. | 105/1.1 |
| 7,072,747 B2 * | 7/2006 | Armbruster et al. | 701/19 |
| 7,198,038 B2 | 4/2007 | McClain | |
| 7,314,041 B2 | 1/2008 | Ogawa et al. | |
| 2005/0166580 A1 * | 8/2005 | Pfaeffle et al. | 60/295 |

FOREIGN PATENT DOCUMENTS

| | | |
|---|---|---|
| EP | 1536109 A1 | 6/2005 |
| GB | 2393404 A | 3/2004 |
| JP | 07117669 A | 9/1995 |
| JP | 10329717 A | 12/1998 |
| WO | 0108958 A1 | 2/2001 |

OTHER PUBLICATIONS

U.S. Appl. No. 12/816,063 pp. 1-44.
EA Office Action dated May 2, 2012 from corresponding Application No. 201000151/31 along with unofficial English translation.

* cited by examiner

*Primary Examiner* — Binh Q Tran
*Assistant Examiner* — Philip Eklem
(74) *Attorney, Agent, or Firm* — GE Global Patent Operation; John A. Kramer

(57) ABSTRACT

Various methods and systems are provided for a vehicle with an engine. In one example, a method includes identifying an approaching tunnel. The method further includes, responsive to a particulate load of a particulate filter, the particulate filter disposed in an exhaust treatment system of an engine of the vehicle, initiating regeneration of the particulate filter at a selected distance before the tunnel such that regeneration is performed before the vehicle enters the tunnel.

20 Claims, 7 Drawing Sheets

SYSTEM AND METHOD FOR REGENERATING A PARTICULATE FILTER

CROSS REFERENCE TO RELATED APPLICATIONS

This application is a continuation-in-part of U.S. patent application Ser. No. 13/022,951 filed Feb. 8, 2011, now U.S. Pat. No. 8,468,809, which is a continuation of U.S. patent application Ser. No. 11/838,296 filed Aug. 14, 2007, now U.S. Pat. No. 7,925,431, the disclosures of each of which are incorporated by reference in their entirety for all purposes.

FIELD

Embodiments of the subject matter disclosed herein relate to methods and systems for controlling regeneration of a particulate filter disposed in an exhaust system of an internal combustion engine.

BACKGROUND

An exhaust gas treatment device may be included in an exhaust system of an engine in a vehicle in order to reduce regulated emissions. In one example, the exhaust gas treatment device may include a diesel particulate filter (DPF) or other particulate matter filter. When the vehicle travels in a tunnel (referred to herein as tunneling operation), high levels of ambient exhaust gas may be inducted by the engine. For example, the tunnel environment may retain exhaust gasses from the engine, or other engines, operating in the tunnel to a greater extent due to the enclosed space. The ingestion of an increased amount of exhaust gas can increase engine out particulate levels. As such, loading of the DPF may occur at an increased rate during tunneling operation, thereby increasing engine backpressure and decreasing engine power output.

BRIEF DESCRIPTION

In one embodiment, an example method for a vehicle includes identifying an approaching tunnel. The method further includes, initiating regeneration of the particulate filter disposed in an exhaust treatment system of an engine of the vehicle responsive to the identification and before entering the approaching tunnel. The regeneration may be initiated at a selected distance from the tunnel's entrance such that at least partial regeneration is performed before the vehicle enters the tunnel. In one example, the distance may be selected such that a substantially complete regeneration of the filter is performed (e.g., greater than 80% of the stored particulate is removed) before the vehicle enters the tunnel.

By initiating regeneration of the particulate filter responsive to the tunnel (even if the particulate filter would not otherwise be regenerated during non-tunneling conditions), the particulate load on the particulate filter may be preferentially reduced for tunneling operation. The particulate filter may thus be cleaned before the vehicle enters the tunnel so that the particulate filter is able to store an increased amount of particulate during the tunneling operation. In this manner, the vehicle may travel through the tunnel with less backpressure increase, and thus greater available engine torque and engine fuel efficiency.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and system for a vehicle with and engine and a particulate filter disposed in an exhaust treatment system of the engine. In one embodiment, an example method includes identifying an approaching tunnel. The method further includes, responsive to the approaching tunnel, and the particulate load of the particulate filter (e.g., whether it is greater than a threshold load), initiating regeneration of the particulate filter at a selected distance. The distance before the tunnel at which regeneration is initiated may be selected based on operating conditions, such that the particulate filter is at least partially regenerated before the vehicle enters the tunnel. For example, the method may select the distance such that a complete regeneration of the filter is performed before entering the tunnel. In this manner, the vehicle begins operation in the tunnel with a cleaner filter to counteract the increased exhaust gas in the tunnel environment. The increased particulate storage capacity of the filter thus reduces the backpressure and torque reduction effects on the engine caused by the tunnel environmental conditions, so that the vehicle is better able to maintain traveling speed and progress through the tunnel. Such operation can be particularly advantageous in that tunneling operation also causes increased engine temperature due to reduced cooling capabilities in the tunnel (due to the enclosed space in the tunnel), which may also limit engine torque capabilities. By enabling the vehicle to better maintain traveling speed through the tunnel, the vehicle can exit the tunnel more quickly thus limiting the temperature effects on the engine.

The approach described herein may be employed in a variety of engine types, and a variety of engine-driven systems, including semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example mobile platform supporting a system incorporating an embodiment of the invention.

Figure 1:
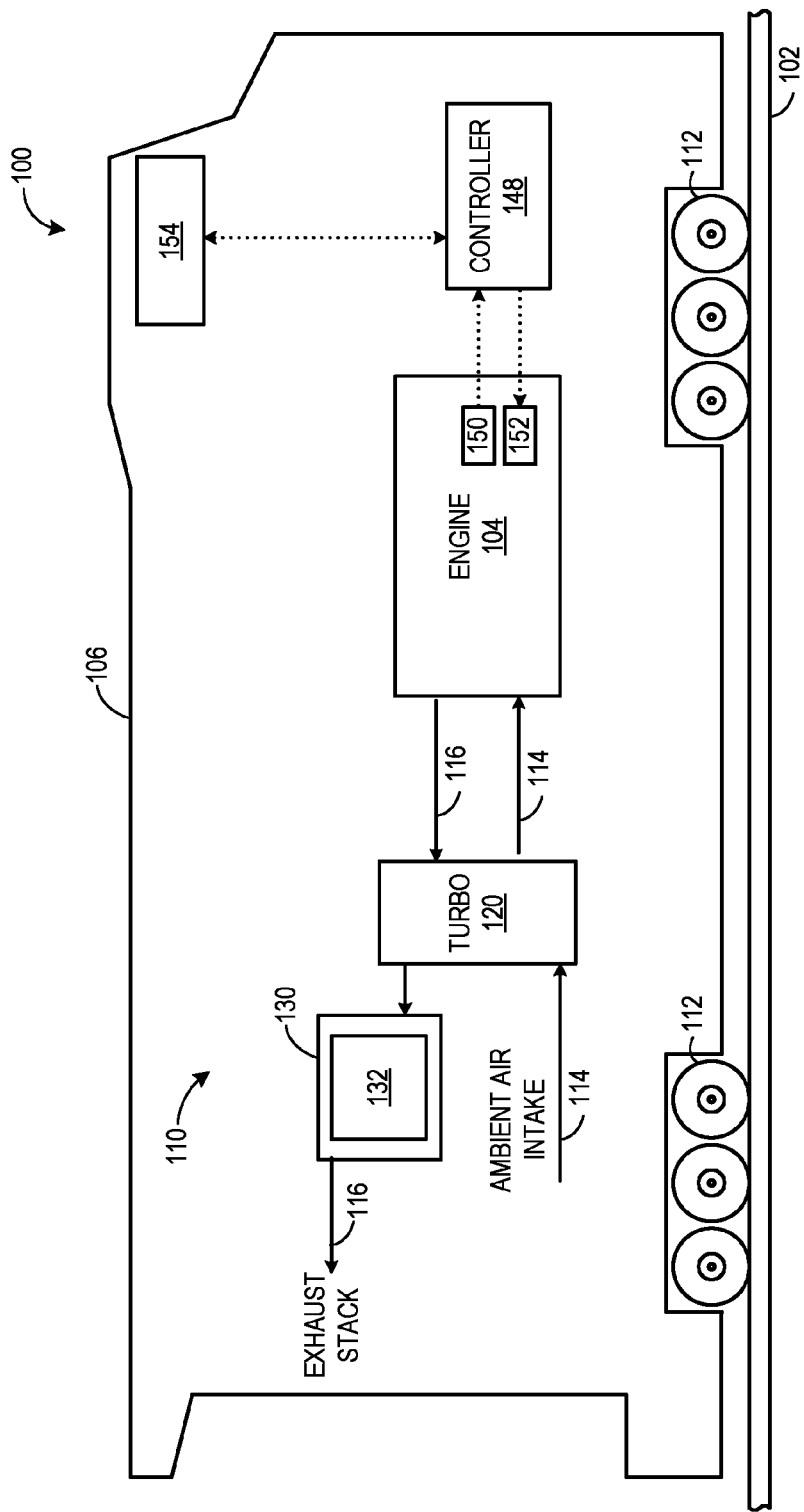
FIG. 1 shows a schematic diagram of an engine including an exhaust treatment system with a particulate filter.

Before further discussion of the pre-tunneling filter regeneration approach, an example of a platform is disclosed in which the exhaust treatment system may be configured for an engine in a vehicle, such as a rail vehicle. For example, FIG. 1 shows a block diagram of an example embodiment of a vehicle system 100 (e.g., a locomotive system), herein depicted as a rail vehicle 106, configured to run on a rail 102 via a plurality of wheels 112. As depicted, the rail vehicle 106 includes an internal combustion engine 104. In other non-limiting embodiments, the engine 104 may be an engine in a marine vessel or off-highway vehicle propulsion system as noted above.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

The engine system 110 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

The engine system 110 further includes an exhaust treatment system 130 coupled in the exhaust passage downstream of the turbocharger 120. The exhaust treatment system 130 may include one or more components. In one example embodiment, the exhaust treatment system 130 may include a diesel particulate filter (DPF) 132. In other embodiments, the exhaust treatment system 130 may additionally or alternatively include a diesel oxidation catalyst (DOC), a selective catalytic reduction (SCR) catalyst, a three-way catalyst, a $NO_x$ trap, various other emission control devices or combinations thereof. The DPF 132 may be cleaned via regeneration, which may be employed by increasing the temperature for burning particulate matter that has collected in the filter. Passive regeneration may occur when a temperature of the exhaust gas is high enough to burn the particulate matter in the filter. During active regeneration, air-fuel ratio or other operating parameters may be adjusted and/or fuel may be injected and burned in the exhaust passage upstream of the DPF in order to drive the temperature of the DPF up to a temperature where the particulate matter will burn.

Further, in some embodiments, a burner may be included in the exhaust passage such that the exhaust stream flowing through the exhaust passage upstream of the exhaust gas treatment device may be heated. In this manner, a temperature of the exhaust stream may be increased to facilitate active regeneration of the exhaust gas treatment device. In other embodiments, a burner may not be included in the exhaust gas stream.

When the vehicle operates outside a tunnel, the intake air received in intake passage 114 is formed of mostly fresh air, even if the locomotive is positioned in a train with other locomotive engines operating and exhausting exhaust gases in to the ambient air. However, when the locomotive operates in a tunnel (as described further below with regard to FIG. 2), the intake air received in intake passage 114 may include a substantial amount of exhaust gas (either from its own engine, or from the exhaust of other engines in the train or from engines previously operating in the tunnel). The increased exhaust gas inducted through the engine causes an increase level of engine out soot in exhaust passage 116 that is delivered to the exhaust treatment system 130 that includes the particulate filter 132.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, etc. Correspondingly, the controller 148 may control the vehicle system 100 by sending commands to various components such as traction motors, alternator, cylinder valves, throttle, etc.

In one example, the controller 148 may estimate geographic coordinates of rail vehicle 106 using signals from positioning sensor, such as a Global Positioning System (GPS) receiver 154. Geographic coordinates of the vehicle 106 may be estimated or calculated. For example, a GPS signal from the GPS receiver 154 may be used to calculate the geographic coordinates of the vehicle. Geographic features in the path of the vehicle, such as the rail vehicle 106, may be signaled by an operator or calculated. For example, geographic coordinates of a set of predefined geographic features may be stored in a table. A distance between the vehicle and the set of predefined geographic features may be calculated so that the nearest geographic feature and its distance may be determined. Non-limiting examples of geographic features that may be stored in the set of predefined geographic features include a tunnel entrance, a steep grade, and a city boundary. Further, the GPS may include stored information about the predefined geographic features, such as length of a tunnel and grade of the tunnel.

Additionally, positional information of the vehicle may also be determined based on operating conditions. For example, based on a transiently increased engine intake air temperature and/or increased coolant temperature, for example, the vehicle may identify that the vehicle has entered a tunnel. One example of a transiently increased temperature may be a temperature that changes by more than a threshold number of degrees per minute for a threshold duration. Similarly, a transiently decreasing temperature may indicate that the vehicle has exited the tunnel. Such positional information may be related by one vehicle to another in a train, so that other vehicles in the train (such as vehicles toward a rear of the train relative to a direction of travel) can determine their position relative to the tunnel.

In some embodiments, a software upgrade for the controller includes a non-transient, computer-readable medium including instructions which, when executed by a processor, control the rail vehicle to initiate regeneration of a particulate filter disposed in an exhaust treatment system of an engine of the rail vehicle in response to indication of an approaching tunnel such that at least partial regeneration of the particulate filter is performed before the rail vehicle enters the tunnel. For example, the computer-readable medium may include instructions for determining a position of an approaching tunnel with respect to a position of the vehicle and determining a particulate load of a particulate filter disposed in an exhaust treatment system of an engine of the vehicle. The computer-readable medium may further include instructions for, when the particulate load is greater than a first threshold load, determining a position with respect to an entrance of the tunnel at which to initiate regeneration of the particulate filter such that the regeneration is completed before the vehicle enters the tunnel based on the position of the approaching tunnel and the particulate load of the particulate filter; and, when the vehicle reaches the determined position at which to initiate the regeneration, initiating the regeneration of the particulate filter by increasing a temperature of the exhaust treatment system.

In some embodiments, an upgrade kit that may be installed in a rail vehicle may include a non-transient computer readable medium including instructions for regenerating a particulate filter in response to indication of an approaching tunnel such that the regeneration is completed before the rail vehicle enters the tunnel, as described above. The upgrade kit may further include one or more sensors or other mechanical elements, such as positioning sensors, pressure sensors, temperature sensors, and the like.

Figure 2:
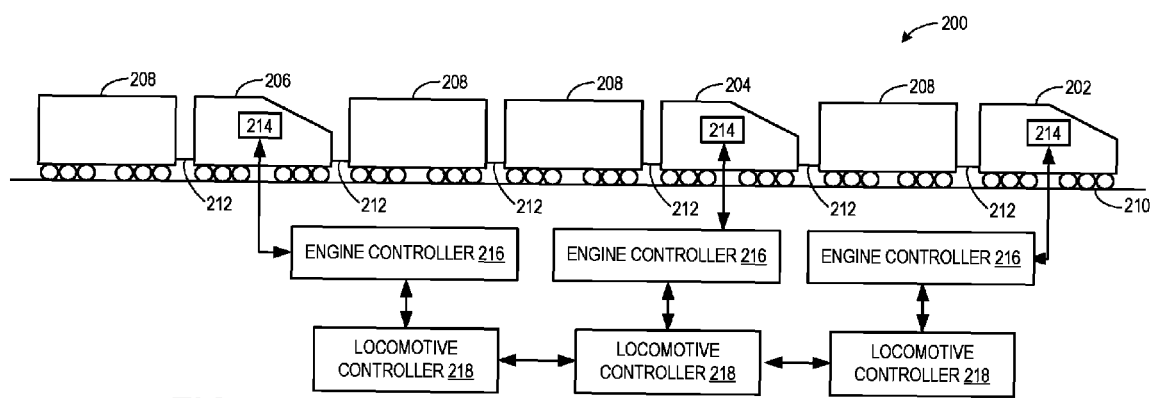
FIG. 2 shows a schematic diagram of an example embodiment of a train including a plurality of rail vehicles.

The rail vehicle 106 depicted in FIG. 1 may be one of a plurality of rail vehicles that make up a rail vehicle consist or train, such as the example train 200 shown in FIG. 2. The train 200 includes a plurality of rail vehicles such as locomotives 202, 204, 206 and a plurality of cars 208, configured to run on track 210. The plurality of locomotives 202, 204, 206 include a lead locomotive 202 and one or more remote locomotives 204, 206. While the depicted example shows three locomotives and four cars, any appropriate number of locomotives and cars may be included in train 200. Further, in the example of FIGS. 2-3 the train 200 is traveling to the right, although the train may travel in either direction.

The locomotives 202, 204, 206 are each powered by a respective engine 214, while cars 208 may be non-powered. In one example, locomotives 202, 204, 206 may be diesel-electric locomotives powered by diesel engines. However, in alternate embodiments, the locomotives may be powered with an alternate engine configuration, such as a gasoline engine, a biodiesel engine, a natural gas engine, or wayside (e.g., catenary, or third-rail) electric, for example.

The locomotives 202, 204, 206 and cars 208 are coupled to each other through couplers 212. While the depicted example illustrates locomotives 202, 204, 206 connected to each other through interspersed cars 208, in alternate embodiments, the one or more locomotives may be connected in succession, as a consist, while the one or more cars 208 may be coupled to a remote locomotive (that is, a locomotive not in the lead consist) in succession.

Each locomotive may include a locomotive controller 218 configured to receive information from, and transmit signals to, each of the locomotives of train 200. Further, locomotive controller 218 may receive signals from a variety of sensors on train 200, and adjust train operations accordingly. Each locomotive controller 218 may be coupled to an engine controller 216, such as the controller 148 described above with reference to FIG. 1, for adjusting engine operations of each locomotive. As elaborated with reference to FIGS. 4, and 5, each engine controller 216 may receive a signal regarding a position of an approaching tunnel with respect to a position of its locomotive of the train. Each engine controller 216 may then determine a threshold particulate load for the particulate filter positioned in its locomotive based on the conditions of the tunnel. When the load of the particulate filter is greater than the threshold load, regeneration of the particulate filter may be initiated at predetermined distance from the tunnel such that the regeneration is at least partially completed before the locomotive enters the tunnel.

In one particular example, each engine of each vehicle may include independent particulate filter regeneration control, where each vehicle may independently initiate regeneration of its engine's particulate filter based upon its particular positional relationship to other locomotives in the train and the tunnel entrance. For example, a first particulate filter of a first vehicle's engine may have a first, higher particulate loading than a second particulate filter of a second vehicle's engine, the first vehicle positioned forward of the second vehicle in the train with respect to the direction of travel, the second filter having a lower soot load than the first particulate filter. With regard to an upcoming tunnel, filter regeneration of each of the particulate filters may be selected to begin based on each vehicle's particulate filter loading and its relative position in the train relative to the tunnel. Herein, the first vehicle may require less capacity to store particulate than the second vehicle, since the second vehicle may re-ingest a greater amount of exhaust gas in the tunnel due to its position behind the first vehicle in the tunnel. Thus, in this example, even though the second particulate filter is less loaded than the first, the second particulate filter may be regenerated for a longer duration before entering the tunnel than the first particulate filter so that the second vehicle can better handle the degrading effects of the tunnel environment (or the second particulate filter may be regenerated, and the first particulate filter may not be regenerated, before entering the tunnel.)

Continuing with the above example, the tunnel may be first identified when the first vehicle enters the tunnel. In this case, the first vehicle may communicate the tunnel existence, and thus the tunnel's relative position with respect to the second vehicle, to the second vehicle. As such, the second vehicle can then determine whether to initiate particulate filter regeneration in order to remove stored particulate before entering the tunnel and better handle the degrading effects of the tunnel environment. Such an approach is particularly advantageous in a train operating without reliable tunnel position information, in that the first vehicle is better able to handle tunnel operation without filter regeneration, while particulate filter regeneration of the second vehicle is more helpful to operation of the engine in the second vehicle.

Figure 3:
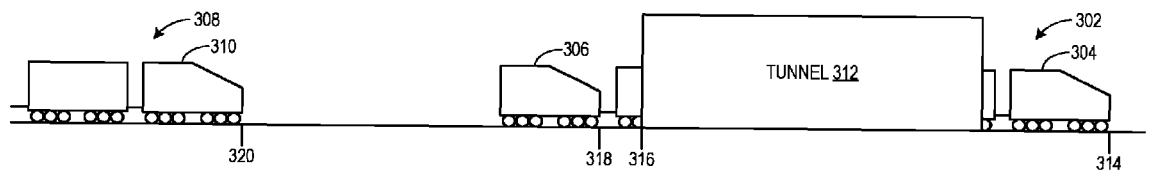
FIG. 3 shows a schematic diagram of a train approaching a tunnel and a train passing through the tunnel.

FIG. 3 shows various example positions of a rail vehicle in a train with respect to a tunnel entrance and exit. Specifically, FIG. 3 shows an example of a train 302, such as the train 200 described with reference to FIG. 2, passing through a tunnel 312 and a train 308, such as the train 200 described with reference to FIG. 2, approaching the tunnel 312. As will be described in greater detail below, regeneration of a particulate filter positioned in each locomotive of the train may be initiated at a selected position as the locomotive is approaching the tunnel such that at least partial regeneration is performed before the train enters the tunnel. Further, particulate filter regeneration may be initiated for a trailing rail vehicle (e.g., locomotive 306 in the direction of travel of FIG. 3) upon exiting the tunnel as particulate filters may become substantially loaded during tunneling operation, particularly for vehicles having engines operating downstream of other vehicle's engines in the tunnel.

The entrance of the tunnel 312 is shown at 316. The train 302, which includes lead locomotive 304 and remote locomotive 306, is shown passing through the tunnel 312. The lead locomotive 304 is positioned at 314 on an exit side of the tunnel and the remote locomotive 306 is positioned at 318 approaching the entrance of the tunnel 312. The train 308, which includes a lead locomotive 310, is shown approaching the tunnel 312, and the lead locomotive 310 is at a position 320.

Regeneration of a particulate filter disposed in the locomotive 310 may be initiated when the locomotive 310 is positioned at 320. For example, the engine controller may receive a signal from a GPS that the locomotive 310 is approaching the tunnel 312, and further, it may be determined that a particulate load of the particulate filter is greater than a threshold load. The controller may determine that, based on the amount of particulate stored on the particulate filter of the engine of locomotive 310, and by knowing the speed the locomotive 310 is expected to travel on the way to the tunnel and how long it will take to burn off the amount of particulate that is stored, the distance to the tunnel from position 320 is sufficient to regenerate the particulate filter, and further allow at least some cooling, before reaching position 318. In this way, regeneration that is initiated at position 320 may end at position 318 where a selected amount of the stored particulate matter (e.g., greater than 50%, for example) is removed from the particulate filter.

In addition to initiating regeneration, the controller may monitor regeneration that was initiated in anticipation of the tunnel to determine whether it has been completed as planned. For example, as the train 302 passes through the tunnel 312, the controller may determine whether regeneration of a particulate filter disposed in locomotive 306 is sufficiently completed (e.g., whether a determined amount of stored particulate has been removed) when the locomotive 306 reaches position 318 before entering the tunnel. As will be described below (FIG. 5), the regeneration may be prematurely ended if it is determined the particulate load of the particulate filter is greater than a threshold load (e.g., if the regeneration is not occurring as estimated). In such an example, the regeneration was continuing for a duration greater than expected, indicating that the particulate load was higher than estimated when initiating regeneration. As such, to reduce regeneration in the tunnel, which can exacerbate cooling issues due to the increase heat of regeneration, the regeneration may be terminated before entering the tunnel. For example, if a locomotive is sufficiently close to the tunnel, such as a position 318 which is less than a threshold distance from the tunnel entrance, regeneration of the particulate filter, if still continuing, is ended irrespective of the particulate storage level or the degree of regeneration completion, in order to reduce excess heat generation in the tunnel. The regeneration may be ended by stopping oxygen flow to the exhaust (e.g., enriching the engine air-fuel ratio), reducing exhaust temperature (e.g., by adjusting fuel injection timing, reducing electric exhaust heating, etc.), and/or stopping the injection of fuel to the aftertreatment system.

Additionally, as noted above, regeneration of a particulate filter positioned in a locomotive may be initiated at position 314. For example, regeneration of the particulate filter positioned in locomotive 306 may be initiated at position 314 as the remote locomotive 306 has passed through the tunnel where particulate loading may be increased due to an increased amount of exhaust in the intake air of the lead locomotive 304.

Figure 4:
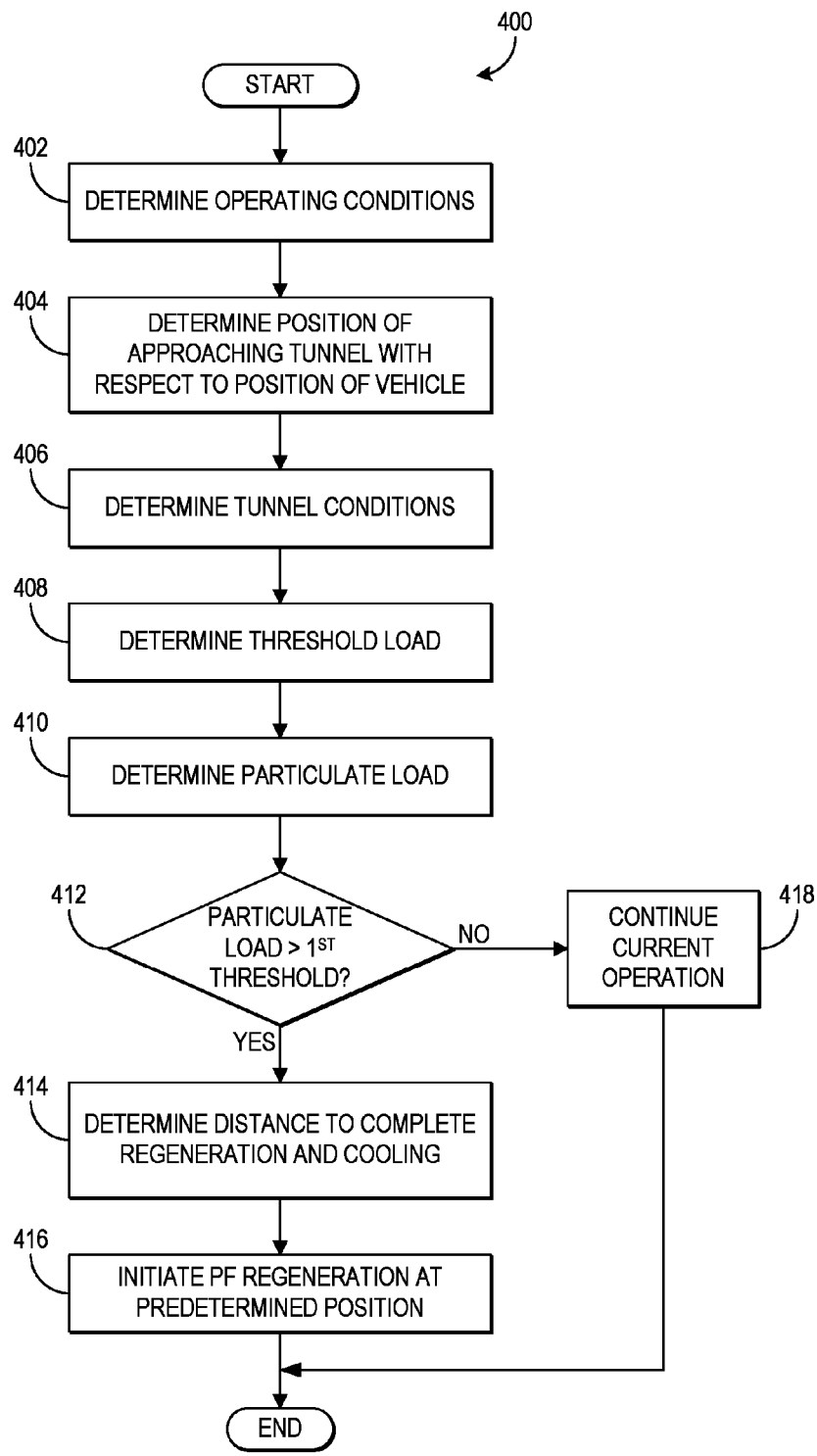
FIG. 4 shows a flow chart illustrating a method for regenerating a particulate filter in response to indication of an approaching tunnel.
Figure 5:
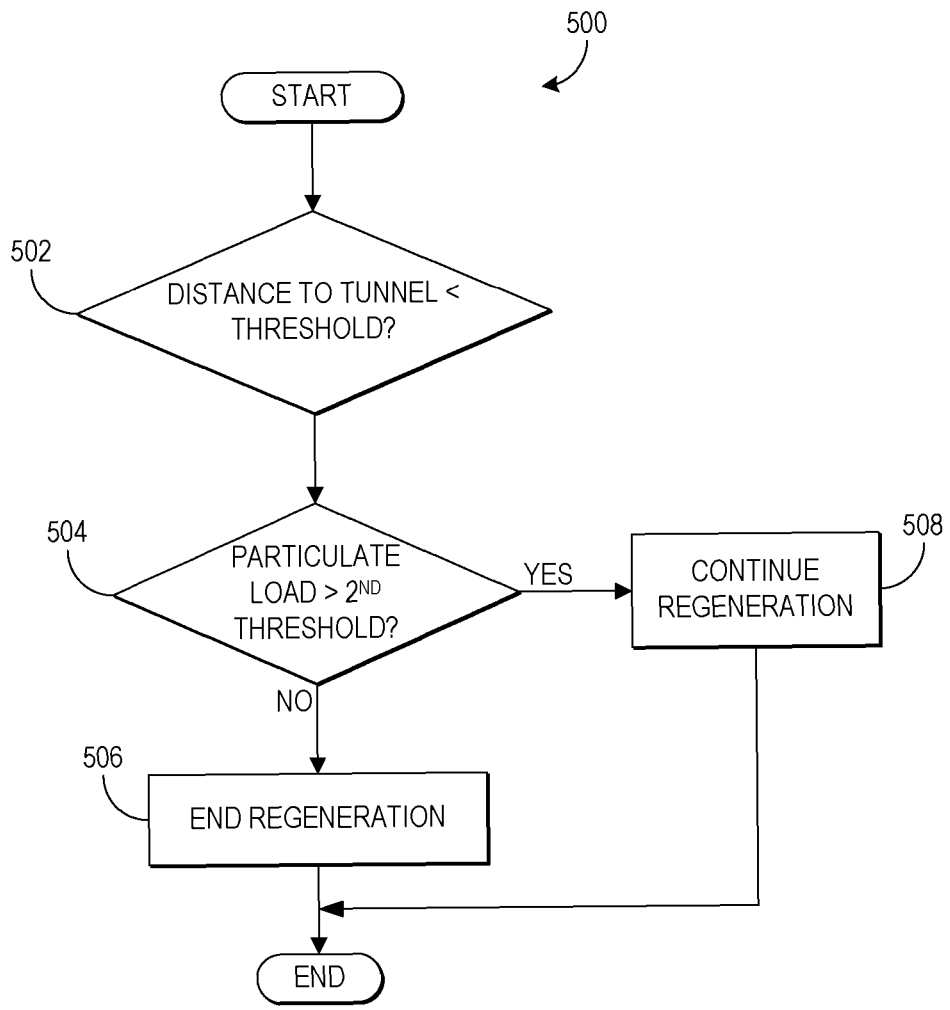
FIG. 5 shows a flow chart illustrating a method for ending regeneration of a particulate filter.

FIGS. 4-5 show flow charts illustrating methods for controlling regeneration of a particulate filter in a vehicle, such as the rail vehicle 106 described above with reference to FIG. 1. In some embodiments, as explained herein, the vehicle may be one of a plurality of rail vehicles in a rail vehicle consist or train, such as the train 200 described above with reference to FIG. 2. FIG. 4 depicts a method for initiating regeneration of a particulate filter disposed in a rail vehicle as the rail vehicle approaches a tunnel, such as the rail vehicle 310 at position 320 in FIG. 3. FIG. 5 depicts a method for ending regeneration of the particulate filter before the regeneration has completed. For example, the method of FIG. 5 may be carried out at the position 318 of the rail vehicle 306 shown in FIG. 3.

In one embodiment, a method for operating a vehicle comprises identifying an approaching tunnel. The method further comprises, responsive to a particulate load of a particulate filter greater than a threshold load, the particulate filter disposed in an exhaust treatment system of an engine of the vehicle, initiating regeneration of the particulate filter at a selected distance before the tunnel such that at least partial regeneration is performed before the vehicle enters the tunnel, the distance to the tunnel selected based on the particulate load of the particulate filter.

In another embodiment, a method for a vehicle comprises, determining a position of an approaching tunnel with respect to a position of the vehicle, and determining a particulate load of a particulate filter disposed in an exhaust treatment system of an engine of the vehicle. The method further comprises, when the particulate load is greater than a threshold load, determining a position at which to initiate regeneration of the particulate filter such that the regeneration is completed before the vehicle enters the tunnel based on the position of the approaching tunnel and the particulate load of the particulate filter. Further, the method comprises, when the vehicle reaches the determined position at which to initiate the regeneration, initiating the regeneration of the particulate filter by increasing a temperature of the exhaust treatment system.

FIG. 4 shows a flow chart illustrating a method 400 for regenerating a particulate filter included in an exhaust treatment system of an engine in a vehicle, such as a rail vehicle 106 described above with reference to FIG. 1. Specifically, the method determines the conditions of an approaching tunnel to trigger particulate filter regeneration, even though normal regeneration conditions are not present. For example, the method may determine a tunnel threshold load for the particulate filter. When the particulate load of the particulate filter is greater than the threshold, and even though it may be below a normal regeneration threshold, regeneration of the particulate filter is initiated such that the particulate filter is cleaned (e.g., regeneration is at least partially, or fully, completed) before the rail vehicle enters the approaching tunnel. The method 400 is carried out responsive to identification of an approaching tunnel. Otherwise, when tunneling operation is not approaching, non-tunneling particulate filter regeneration is carried out, which includes determining whether the particulate load is greater than the normal regeneration threshold (that is greater than the tunneling threshold load, discussed below with regard to 412). If the particulate load is greater than the normal regeneration threshold, regeneration is performed, otherwise, operation is continued without particulate filter regeneration.

At 402, vehicle operating conditions are determined. Vehicle operating conditions may include exhaust temperature, ambient temperature, engine air-fuel ratio, and the like.

At 404, a position of an approaching tunnel is determined with respect to the position of the rail vehicle. For example, the distance between the rail vehicle and the tunnel is determined. When the rail vehicle is part of a train, or consist, which includes a plurality of rail vehicles, a position of the approaching tunnel with respect to each rail vehicle is determined. As such, the distance between the tunnel and each rail vehicle in the consist may vary due to the relative positioning of each vehicle in the train.

The position of the vehicle relative to the tunnel may be based on various information. For example, the vehicle may utilize GPS information and stored data of tunnel entrances. As another example, tunnel conditions may be identified by a forward vehicle in a train that has entered the tunnel, and the vehicle may determine the distance to the tunnel based on the distance (e.g., number of cars/locomotives) from the vehicle to the forward vehicle in the train. In other examples, the tunnel may be identified by a wireless transponder at an entrance of the tunnel, a wireless transponder at a set distance before the tunnel, image processing of locomotive camera data, manual entry by an operator, monitoring external ambient conditions (e.g., light, temperature, sound, etc.), and the like. In some examples, an approaching tunnel may be indicated when the vehicle crosses a geo-fence. For example, a geo-fence may enclose an area which includes the tunnel and an area around the tunnel. In response to the vehicle crossing the geo-fence, a signal may be sent to the vehicle controller notifying the vehicle controller of an approaching tunnel. Still other approaches may also be used to identify tunnel conditions, and the relative distance of a rail vehicle to the tunnel entrance.

Once the position of the approaching tunnel is determined, tunnel conditions are determined at 406. Tunnel conditions may include length and grade of the tunnel and whether the tunnel is uphill or downhill. For example, a particulate filter may accumulate a greater amount of particulate matter while passing through a longer tunnel than while passing though a shorter tunnel. Further, there may be a greater power demand on an engine in a rail vehicle travelling through a tunnel with a steep uphill grade compared to a rail vehicle travelling through a tunnel with a less steep uphill grade or a downhill grade. Each of these factors can influence whether to regenerate a particular particulate filter before entering the tunnel, as well as the degree to which the regeneration is performed before entering the tunnel, as explained below. In this regard, lightly loaded particulate filter regeneration is generally avoided since the act of regeneration requires increasing exhaust temperature, which utilizes stored fuel, or some other stored energy source. As such, there may be a fuel economy penalty to each regeneration, and filter regeneration before entering a tunnel may be performed only if the particulate filter is sufficiently loaded to justify the regeneration.

As an example, particulate filter regeneration before entering a tunnel may be more liberally employed with lightly loaded particulate filters for upcoming tunnels that are relatively longer and/or have an uphill grade that is greater than a threshold grade, and vice versa. In this example, even a relatively small reduction in the amount of stored particulate before entering the tunnel may justify performing what would otherwise be an unnecessary regeneration since it may enable the vehicle, or train, to maintain a higher speed through the tunnel and thus reduce degraded cooling performance impacts. As another example, longer or more complete particulate filter regenerations may be used for a vehicle before entering relatively longer tunnels and/or steeper uphill tunnels having an uphill grade greater than a threshold, and vice versa. Again, providing the vehicle with greater particulate filter capacity when entering the tunnel can enable the vehicle, or train, to maintain a higher speed through the tunnel and thus reduce degraded cooling performance impacts. Similar differential operation depending on an in-train position of the vehicle, such as whether a vehicle is forward or behind another vehicle with an engine, in that a particulate filter of vehicle position behind (either directly, or with intervening vehicles) may be regenerated more fully (or with a lower amount of stored particulate) before entering the tunnel.

Returning to FIG. 4, once the tunnel conditions are determined, a first threshold particulate load for the particulate filter is determined at 408. As indicated above, the first threshold load may depend on the tunnel conditions, and/or the relative positioning of the vehicle relative to other vehicles with operating engines. As an example, if the approaching tunnel is a relatively long tunnel, the threshold load may be 30% of a fully loaded capacity of the particulate filter. If the approaching tunnel is a relatively short tunnel, the first threshold load may be 60% of the fully loaded capacity of the particulate filter. If the tunnel is relatively long and has a steep grade for at least a portion of the tunnel, the first threshold load may be 10% of a fully loaded capacity of the particulate filter.

Furthermore, the first threshold load may be determined based on the position of the rail vehicle in which the particulate filter is disposed in the train or consist. For example, the first threshold load of a particulate filter disposed in a lead rail vehicle may be smaller than the first threshold load of a particulate filter disposed in a remote locomotive. Similarly, the first threshold load of a particulate filter disposed in a remote rail vehicle close to the front of the consist may be smaller than the first threshold load of a particulate filter disposed in a remote vehicle close to the end of the consist.

At 410, the particulate load of the particulate filter is determined. In an example in which the rail vehicle is part of a consist, the particulate load of the particulate filter in each rail vehicle of the consist may be determined. In one example, the particulate load may be determined based on a pressure drop across the particulate filter. In another example, the particulate load may be determined based on an estimated amount of particulate matter in the engine exhaust and a loading rate of the particulate filter.

Once the particulate load is determined, it is determined if the particulate load of the particulate filter is greater than the first threshold load at 412. If it is determined that the particulate load is not greater than the first threshold load, the method moves to 418 and current operation is continued without carrying out regeneration of the particulate filter.

On the other hand, if it is determined that the particulate load is greater than the first threshold load, the method continues to 414 and 416 to carry out at least partial regeneration before entering the tunnel.

In some examples, depending on the various factors explained herein, regeneration may be carried out in a plurality of rail vehicles in a consist based on the upcoming tunneling operation. In other examples, regeneration may be carried out in only one rail vehicle in a consist before entering the tunnel. In still other examples, regeneration may not be carried out in any of the rail vehicles of the consist based on the conditions of the approaching tunnel.

Continuing with FIG. 4, at 414 the distance needed to at least partially regenerate the particulate filter, and then cool the filter is determined. As an example, based on the particulate load of the particulate filter, an estimated time (for heating the particulate filter, at least partially regenerating the particulate filer, and cooling the particulate filter to a pre-regeneration temperature), and current and predicted speeds of the vehicle, the distance may be determined. For example, the distance may be selected so that the filter is substantially regenerated and substantially all of the stored soot is removed (e.g., at least 80% of the stored soot is removed) before entering the tunnel. The distance may also be selected so that a selected amount of soot is removed during the filter regeneration before entering the tunnel. For example, the method may determine the distance such that at least a minimum amount of stored particulate (e.g. 50% of the stored particulate) is removed by the regeneration before entering the tunnel. In another example, the method may determine the distance such at least a selected mass (e.g., in grams) of the stored soot is removed by the regeneration before entering the tunnel. Further, a greater distance may be selected for vehicles with particulate filters more likely to be overloaded during tunneling operation, such as remote locomotives of a train.

As explained above, the amount of particulate to be removed during regeneration may be selected based on conditions of the tunnel or the relative position of the rail vehicle in a train and with respect to other vehicles having operating engines.

Once the distance to complete regeneration is selected, regeneration of the particulate filter is initiated at the selected distance, or position, before the tunnel at 416. As described above, the distance may be selected based on the particulate load of the particulate filter, the time to complete a determined amount of regeneration, current and predicted speeds of the vehicle, and cooling such that the desired degree of regeneration of the particulate filter is performed before the rail vehicle enters the approaching tunnel. As an example, the predetermined distance from the tunnel may be a distance such that regeneration and cooling are completed just before the rail vehicle enters the tunnel so that the particulate filter may be as clean as possible when starting tunneling operation.

Regeneration may be initiated by at least one of adjusting an engine air-fuel ratio, increasing an engine load, and injecting fuel upstream of the exhaust treatment system in an exhaust passage of the engine. In some examples, regeneration may be initiated by adjusting an engine air-fuel ratio such that exhaust with a higher temperature is produced to increase a temperature of the exhaust treatment system. In other examples, fuel may be injected upstream of the exhaust treatment system and combusted in the exhaust in order to heat the exhaust treatment system and the particulate filter. In examples in which the rail vehicle is part of a train or consist, a load distribution of the consist may be shifted such that the engine of the vehicle in which the particulate filter is disposed operates with a higher load in order to increase a temperature of the exhaust treatment system, while vehicle with non-regenerating particulate filters may operate with a lower engine load to maintain the overall train power settings.

Thus, regeneration of the particulate filter may be carried out before the rail vehicle in which the particulate filter is disposed enters a tunnel. In this manner, the particulate filter may be cleaner and have a greater storage capacity when the rail vehicle enters the tunnel. The particulate filter's greater storage capacity and thus a greater amount of particulate matter may accumulate in the particulate filter as the rail vehicle passes through the tunnel. Because a greater amount of particulate matter may accumulate in the filter, engine airflow and power output may be better maintained while the vehicle passes through the tunnel, or at least maintained for a longer duration while passing through the tunnel. Further, once the rail vehicle enters the tunnel, particulate filter regeneration may be temporarily disabled until the vehicle exits the tunnel. It should be understood regeneration may be completed in one or more rail vehicles of a rail vehicle consist before the rail vehicles enters the tunnel. For example, the method may be carried out based on each individual rail vehicle. As an example, a rail vehicle at the front of a consist may begin regeneration at a different time, or location, than a rail vehicle at the back of the consist that has a higher particulate load. The order in which regeneration may be carried out may be based on the particulate load of the filter and/or the position of the rail vehicle in the rail vehicle consist.

FIG. 5 shows a flow chart illustrating a method 500 for stopping regeneration before it is completed, if desired. Specifically, the method determines if regeneration is proceeding as expected, or predicted, and ends the regeneration if it will not be completed before entering the tunnel.

At 502, it is determined if a distance to the tunnel is greater than a threshold distance. As an example, the threshold distance may be a distance before the tunnel at which regeneration is expected to be completed. As another example, the threshold distance may be a distance before the tunnel at which regeneration is expected to be 50% completed. It should be understood the threshold distance may be any suitable distance from the tunnel.

At 504, it is determined if the particulate load is less than a second threshold load. The second threshold load may be based on the distance from the tunnel or the duration regeneration of the particulate filter has been occurring. For example, the second threshold load may be a predicted load at the threshold distance. As such, the second threshold load may be less than the first threshold load (of FIG. 4). In other examples, the second threshold load may be the same as the first threshold load. If it is determined that the particulate load is less than the second threshold load, the method continues to 508 and regeneration continues.

On the other hand, if it is determined that the particulate load is greater than the second threshold load, the method continues to 506 and regeneration is ended. If the particulate load is greater than the second threshold load, regeneration may not be proceeding as expected and the regeneration may not finish before the rail vehicle enters the tunnel, for example. Because the temperature of the vehicle system may increase while the rail vehicle is passing through the tunnel, the regeneration may be ended so that the rail vehicle system does not start out operation in the tunnel at a higher temperature than necessary.

Thus, regeneration may be ended prematurely before the rail vehicle enters the tunnel. In this manner, components of the vehicle system such as the exhaust treatment system may be cooled before the vehicle enters the tunnel such that the vehicle can better handle the increased temperature conditions in the tunnel. In some examples, pre-cooling may be initiated when an approaching tunnel is identified, for example, when a vehicle crosses a geo-fence. In one example, pre-cooling may be performed if it is determined that regeneration is not desired before the vehicle enters the tunnel. As another example, pre-cooling may be performed in the time between when regeneration ends and before the vehicle enters the tunnel.

In some embodiments, regeneration of the particulate filter may not be carried out when the vehicle is traveling in the tunnel. Instead, regeneration may be initiated when the vehicle exits the tunnel, as described in greater detail below with reference to FIG. 8.

While FIGS. 4-5 provide an example of determining a distance to the tunnel at which to initiate regeneration such that at least partial regeneration is performed before entering the tunnel, various alternative approaches may be used. For example, FIGS. 6-7 provide an example that determines a duration, such as time in minutes, before entering the tunnel, and initiates regeneration based on when the determined duration equals the estimated time required to at least partially regenerate the particulate filter, plus a small safety margin threshold.

Figure 6:
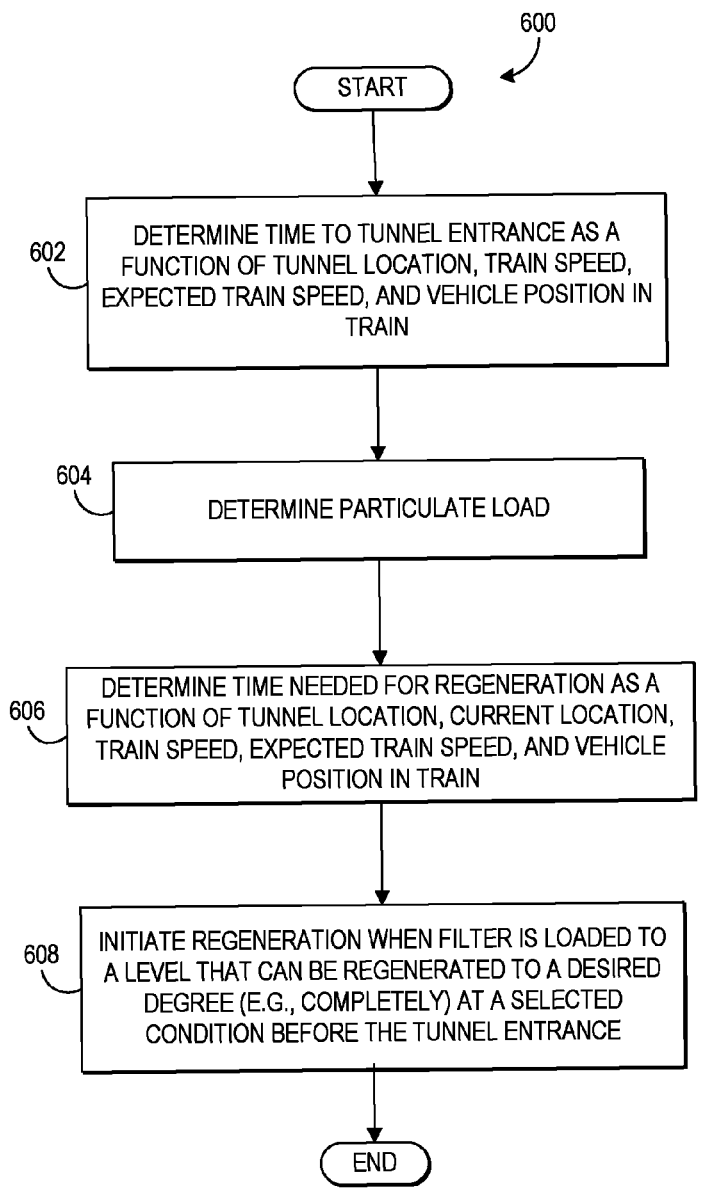
FIG. 6 shows a flow chart illustrating a method for regenerating a particulate filter according to another embodiment of the present disclosure.
Figure 7:
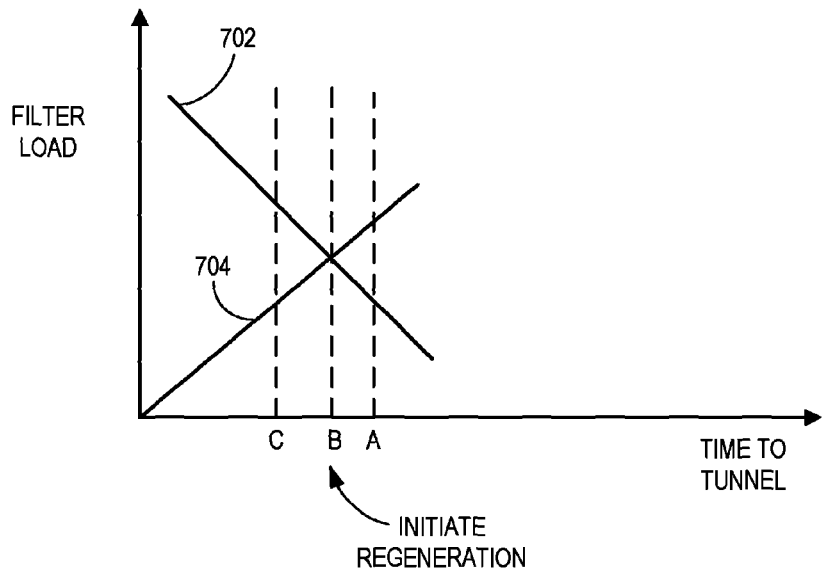
FIG. 7 shows a graph illustrating an example operation according to the method of FIG. 6.

For example, FIG. 6 shows a flow chart illustrating a method 600 for regenerating a particulate filter included in an exhaust treatment system of an engine in a vehicle, such as a rail vehicle 106 described above with reference to FIG. 1. The method of 600 is carried out responsive to identification of an approaching tunnel. Otherwise, when tunneling operation is not approaching, non-tunneling particulate filter regeneration is carried out, as described above. Similar to FIGS. 4-5, each locomotive in a train may independently carry out its own routines for controlling particulate filter generation based on the particular position and other operating conditions of that locomotive, although the locomotives may share information regarding the overall position of the train with respect to the tunnel, for example.

At 602, a time to an approaching tunnel entrance is estimated as a function of tunnel location, present location of the rail vehicle or train, rail vehicle or train speed, expected rail vehicle or train speed, and other operating parameters if desired. For example, the estimated time to the approach tunnel may be based on the distance to the tunnel (based on GPS locations and a track profile) and rail vehicle speed (both current and projected based on a predetermined trip plan which may be optimized for various parameters, such as fuel economy).

Next, at 604, a current particulate load of the particulate filter is determined, similar to 410 of FIG. 4. Then, at 606, a required particulate filter regeneration time is estimated for a regeneration of a selected degree (e.g., greater than 80% regeneration or other such level) for the current particulate load (from 604) based on operating conditions, such as the tunnel location with respect to the rail vehicle, present location of the rail vehicle, train speed, expected train speed between the present position and the tunnel entrance, and other operating parameters, if desired. For example, the method may estimate the operating conditions, such as engine loading, expected along the route leading to the tunnel entrance to estimate the progress of particulate filter regeneration. In particular, filter regeneration rates may depend on exhaust temperature, which in turn depend on engine load. As such, if expected conditions leading up to the tunnel include high engine load conditions, a faster regeneration rate may be predicted, thus leading to a lower required regeneration time (meaning that the method may initiate regeneration closer to the tunnel as compared to when expected future operating conditions include lower engine load demands). Further, the estimated time needed to perform the particulate filter generation is determined such that the regeneration is completed within a selected condition (e.g., time or distance) before entering the tunnel. In this way, the regeneration is performed as late as possible, but yet still completed before entering the tunnel.

Next, at 608, the method compares the estimated time needed to perform filter regeneration with the estimated time before entering the tunnel and initiates regeneration based on the comparison. In one example, the method initiates particulate filter regeneration when the estimated time to regenerate the particulate filter, plus an estimated time to cool the exhaust to a threshold (e.g. pre-regeneration) temperature, plus a threshold margin to account for estimation inaccuracies, is equal the estimated time before entering the tunnel. Further, similar to FIGS. 4-5, the method may additionally monitor regeneration and terminate the regeneration if it is not completed as estimated within a threshold condition (e.g. time or distance) before entering the tunnel.

FIG. 7 illustrates an example operation according to the method of FIG. 6. Specifically, FIG. 7 illustrates a graph of particulate filter loading versus time to entering the tunnel (where real-time moves from right to left in that the time to the tunnel decreases as real-time progresses). A first line 702 illustrates the continually increasing particulate filter loading as the rail vehicle continues to operate and additional particulate matter is stored on the particulate filter therein. Likewise, line 704 illustrates the amount of particulate that can be regenerated in the available time before entering the tunnel.

Starting at point "A", the particulate filter is relatively lightly loaded with soot, such that a regeneration of a desired degree of completeness of the stored soot (and then some) can be completed before entering the tunnel, assuming filter regeneration is initiated at this point. As such, regeneration may not yet be initiated. Rather, at point "B", the particulate filter is loaded to a level where the required regeneration time (to achieve a desired degree of completeness of filter regeneration of the stored soot) matches the available time to the tunnel entrance. As such, particulate filter regeneration may be initiated. At point "C", the particulate filter is relatively heavily loaded with soot, such that less than all of the stored soot can be regenerated before entering the tunnel, assuming filter regeneration is initiated at this point. If such conditions are encountered, either it is too late to initiate regeneration, or less complete, or incomplete, regeneration than desired may be performed before entering the tunnel.

Figure 8:
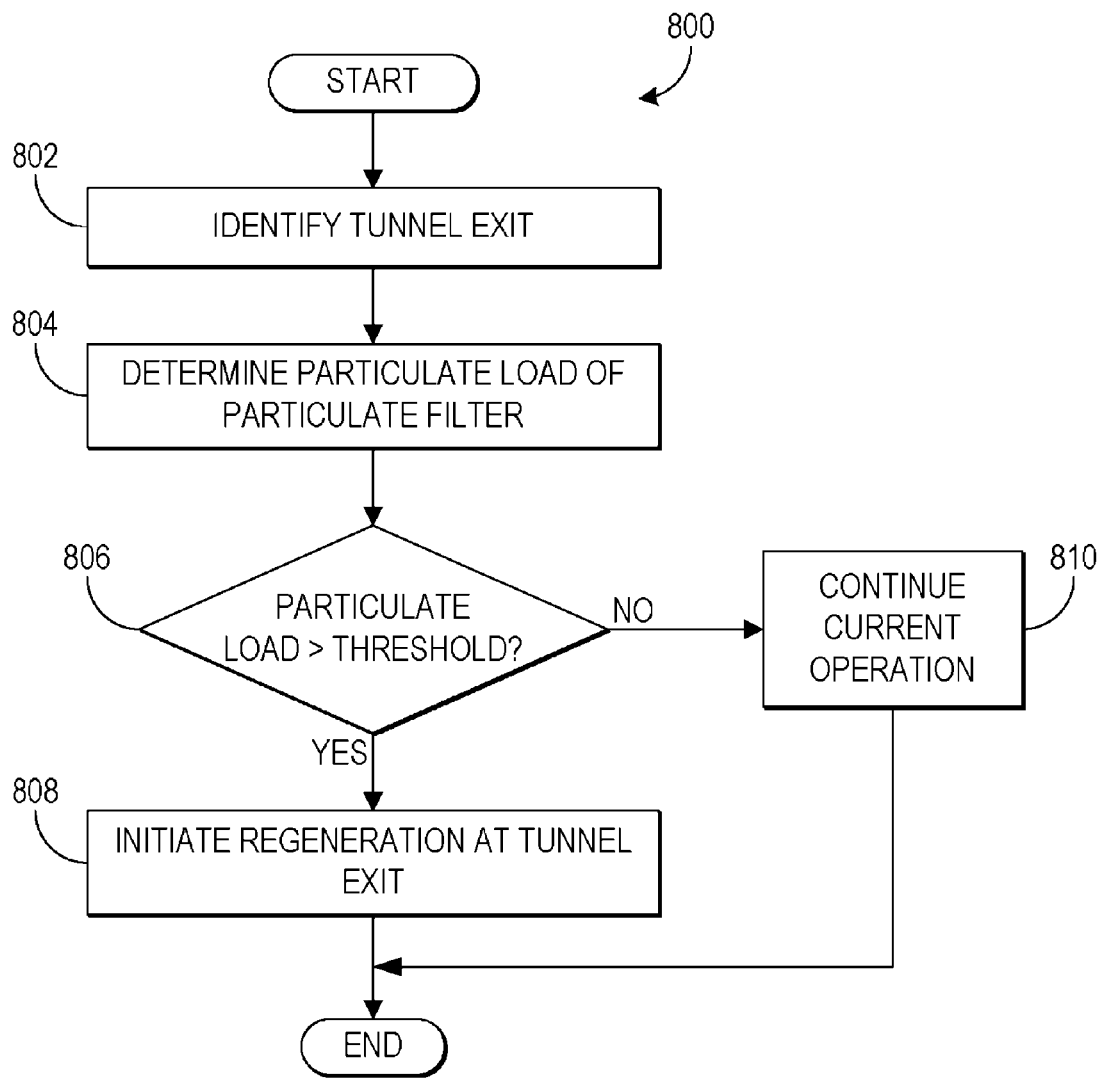
FIG. 8 shows a flow chart illustrating a method for initiating regeneration of a particulate filter in response to indication of a tunnel exit.

FIG. 8 shows a flow chart illustrating a method 800 for initiating regeneration of a particulate filter included in an exhaust treatment system of an engine in a vehicle, such as a rail vehicle 106 described above with reference to FIG. 1. Specifically, the method identifies a tunnel exit with respect to a particular vehicle in which the method is carried out, and initiates regeneration of the particulate filter in response to the tunnel exit, as well as other operating parameters such as tunnel condition, engine conditions, and/or exhaust conditions, including a particulate load of the particulate filter at the exit.

At 802, the tunnel exit is identified. The tunnel exit may be identified similarly to the identification of the tunnel, including the tunnel entrance, as described above. For example, the vehicle may utilize GPS information and stored data of tunnel exits. In other examples, the tunnel exit may be identified by a wireless transponder at the exit of the tunnel, crossing a geo-fence out of a tunnel area, image processing of locomotive camera data, manual entry by an operator, monitoring external ambient conditions (e.g., light, temperature, sound, etc.), and the like. Still other approaches may also be used to identify an exit of a tunnel.

Figure 9:
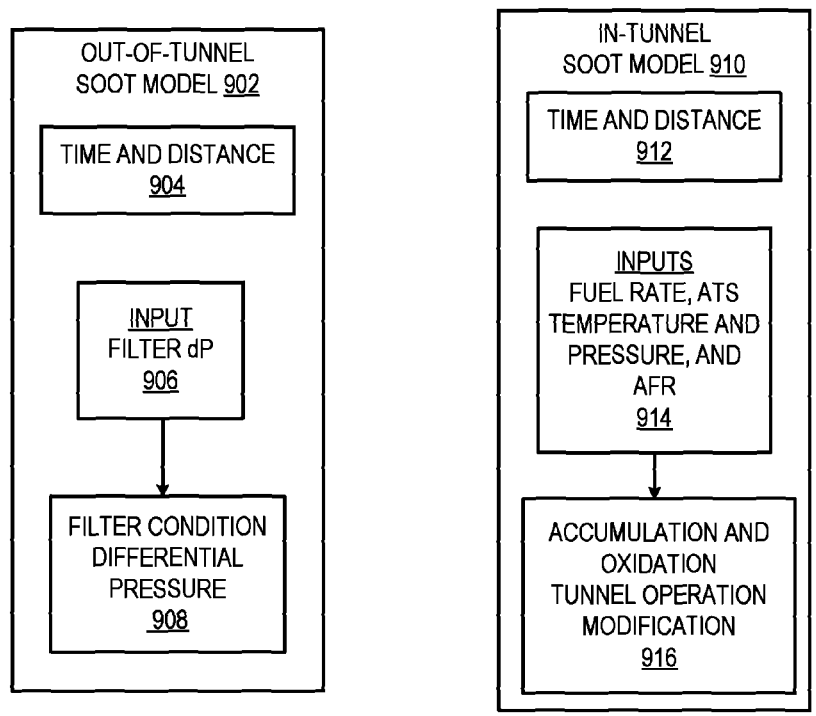
FIG. 9 depicts aspects of determining a particulate load based on a modified soot model.

Once the tunnel exit is identified, the particulate load of the particulate filter is determined at 804. The particulate load may be determined based on a modified soot model for tunneling operation, as depicted in FIG. 9. During out-of-tunnel operation, the soot model 902 may depend on time and distance of operation 904. Further, the input 906 for determining particulate load may be a change in pressure across the filter (e.g., filter delta pressure, dP). As such, a filter condition 908 for determining particulate load may be differential pressure, and regeneration may be initiated when the differential pressure of the filter is greater than a threshold. During in-tunnel operation, the soot model 910 may also depend on time and distance of tunnel operation 912. The inputs 914 for determining a particulate load while the vehicle is traveling through a tunnel may include fuel rate, aftertreatment system temperature and pressure, and exhaust air-fuel ratio. Due to vehicle conditions within the tunnel, accumulation and oxidation of the particulate filter may change leading to tunnel operation modification 916 of the soot model. For example, during tunneling operation, accumulation of the particulate filter may increase, and oxidation of the particulate may decrease due to a reduced concentration of oxygen in the exhaust. Thus, the modified soot model may account for these changes in rates, and a need to regenerate the particulate filter may be indicated sooner. In order to maintain lower operating temperatures in the tunnel, however, regeneration may not be carried out inside the tunnel. Instead, regeneration may be initiated as the vehicle leaves the tunnel, as described with reference to FIG. 8.

Continuing with FIG. 8, at 806, it is determined if the particulate load is greater than a threshold load. The threshold load may be a different threshold load than the first and second threshold loads described above with reference to FIGS. 4 and 5 and regeneration before entering the tunnel. The load of the particulate filter may vary based on operating conditions of the vehicle during the tunneling operation, as well as the tunnel conditions.

As another example, a vehicle that operates with a higher engine load and speed through a longer tunnel with a steep grade may have a greater particulate filter load than a vehicle that operates with a lower engine load and speed through a shorter tunnel with a less steep grade, and thus may utilize regeneration at or in response to the exit. As another example, a vehicle that operates with a particular engine load and speed may have a lower particulate load after passing through a shorter tunnel than a longer tunnel, and may not utilize regeneration at or in response to the exit.

If it is determined that the particulate load is less than the threshold load, the method moves to 810 and current operation is continued. On the other hand, if it is determined that the particulate load is greater than the threshold load, regeneration of the particulate filter is initiated at 808 in response to the tunnel exit condition. In some examples, depending on the various factors explained herein, regeneration may be carried out in a plurality of rail vehicles in a consist based on the tunnel exit condition.

As described above, regeneration may be initiated by at least one of adjusting an engine air-fuel ratio, increasing an engine load, and injecting fuel upstream of the exhaust treatment system in an exhaust passage of the engine. In examples in which the rail vehicle is part of a train or consist, a load distribution of the consist may be shifted such that the engine of the vehicle in which the particulate filter is disposed operates with a higher load in order to increase a temperature of the exhaust treatment system, while vehicle with non-regenerating particulate filters may operate with a lower engine load to maintain the overall train power settings.

Thus, regeneration of a particulate filter may be initiated in response to identification of an exit of a tunnel. Whether or not the regeneration is initiated may be based on various operating parameters during the tunneling operation which affect the particulate filter load, such as engine load and speed and tunnel conditions such as length and grade.

Another embodiment relates to a method for operating a vehicle. The method comprises receiving data relating to an approaching tunnel (e.g., the data relates to a tunnel that the vehicle is approaching along a route). The method further comprises, responsive to the data, generating control signals for initiating regeneration of a particulate filter before entering the approaching tunnel, e.g., before the vehicle enters the tunnel. The particulate filter is disposed in an exhaust treatment system of an engine of the vehicle. In another embodiment, the regeneration is initiated at a time and/or position such that the particulate filter is at least partially regenerated prior to the vehicle entering the tunnel.

In one embodiment, a system comprises a control module configured for operable deployment on a first rail vehicle of a rail vehicle consist including the first rail vehicle and plural second rail vehicles. The control module is configured to determine positions of the first rail vehicle and the second rail vehicles with respect to a position of an approaching tunnel and with respect to each other, and to generate control signals for initiating regeneration of one or more particulate filters of the vehicles at a selected condition before the tunnel responsive to the determined positions. The control module may be hardware and/or software having control functionality as indicated. Hardware and/or software module refers to tangible media such as one or more electronic components and/or sets of machine readable instructions, stored on a non-transitory medium, that perform or cause to be performed one or more designated functions. The control module may be a stand alone unit, or part of a vehicle controller or other control unit or system on the vehicle.

In another embodiment, a system comprises a control module configured for operable deployment on a vehicle. The control module is configured to receive data relating to at least one of a position of the vehicle or a tunnel that the vehicle is approaching, and to generate control signals for initiating regeneration of a particulate filter of the vehicle before the vehicle enters the tunnel. The control module may be hardware and/or software having control functionality as indicated. Hardware and/or software module refers to tangible media such as one or more electronic components and/or sets of machine readable instructions, stored on a non-transitory medium, that perform or cause to be performed one or more designated functions. The control module may be a stand alone unit, or part of a vehicle controller or other control unit or system on the vehicle.

In another embodiment, a system comprises a rail vehicle consist including a plurality of rail vehicles and an engine disposed in each rail vehicle, each engine including an exhaust treatment system with a particulate filter. The system further comprises a controller configured to determine a position of each rail vehicle with respect to a position of an approaching tunnel and with respect to each other, and to initiate regeneration of one or more particulate filters at a selected condition before the tunnel, such as one or more of a time before the tunnel or a distance before the tunnel, responsive to the determined positions. Each engine may further comprise a turbocharger system coupled to the engine. The controller may be further configured to determine a length and grade of the approaching tunnel via a GPS, and initiation of regeneration may be further responsive to the length and grade of the approaching tunnel. The controller may be further configured to adjust an exhaust temperature to initiate the regeneration of the one or more particulate filters via adjustment of a load distribution among the rail vehicle consist.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

When an embodiment is referred to herein as comprising a plurality of elements "each" having one or more constituent elements or characteristics, this does not preclude additional such elements (additional to the plurality) not having such constituent elements or characteristics. In other words, stating that a plurality of elements each have one or more constituent elements or characteristics means that at least two of such elements have the constituent elements or characteristics, not that every such element have the constituent elements or characteristics, unless otherwise specified.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for operating a rail vehicle consist including a plurality of rail vehicles, comprising:
    identifying an approaching tunnel;
    determining a particulate load of a particulate filter disposed in an exhaust treatment system of an engine of each vehicle;
    determining a particulate load threshold for each vehicle based on a position of the vehicle with respect to the other vehicles in the consist; and
    when the particulate load of a particulate filter of a vehicle of the consist is greater than the particulate load threshold for that vehicle, initiating regeneration of its particulate filter responsive to the identification and before entering the approaching tunnel.

2. The method of claim 1, wherein the initiation of regeneration of a particulate filter of a vehicle of the consist is further responsive to a comparison of an estimated duration until the vehicle reaches the tunnel and an estimated duration of performing the regeneration.

3. The method of claim 1, wherein regeneration of a particulate filter of a vehicle of the consist is initiated at a selected distance before the approaching tunnel, the distance selected such that at least partial regeneration is completed before the vehicle enters the tunnel.

4. The method of claim 3, wherein the distance is selected based on a particulate load of the particulate filer and conditions of the tunnel.

5. The method of claim 3, further comprising at least partially cooling the exhaust treatment system of the vehicle after regeneration but before entering the tunnel.

6. The method of claim 1, wherein determination of the particulate load threshold for each vehicle is further based on operating conditions, including the threshold being set to a lower particulate load threshold before entering a longer tunnel, and to a higher particulate load threshold before entering a shorter tunnel.

7. The method of claim 1, wherein the initiation of regeneration of a particulate filter of a vehicle of the consist is further based on a grade of the approaching tunnel.

8. The method of claim 1, further comprising terminating an incomplete regeneration of a particulate filter of a vehicle of the consist before the vehicle enters the approaching tunnel.

9. The method of claim 1, wherein the vehicles of the consist comprise a plurality of remote locomotives and a lead locomotive, the remote locomotives coupled in a train with the lead locomotive, and wherein regeneration of the particulate filter of each remote locomotive is initiated at a further distance from the tunnel than regeneration initiation of the particulate filter of the lead locomotive.

10. The method of claim 1, wherein the approaching tunnel is identified by only one of the vehicles of the consist.

11. A method for operating a first vehicle of a rail vehicle consist, comprising:
    determining a position of an approaching tunnel with respect to a position of the first vehicle;
    determining a length of the approaching tunnel;
    determining a particulate load of a particulate filter of the first vehicle;
    determining a particulate load threshold for the first vehicle based on the length of the approaching tunnel; and
    initiating regeneration of the particulate filter of the first vehicle before entering the approaching tunnel if the particulate load is greater than the threshold, wherein the regeneration is completed within a selected duration or distance before the first vehicle enters the tunnel based on the position of the approaching tunnel and vehicle speed.

12. The method of claim 11, further comprising monitoring progress of the particulate filter regeneration, and terminating the regeneration before entering the tunnel, even if the particulate filter is not fully regenerated.

13. The method of claim 11, wherein the initiation of regeneration is further based on expected future vehicle operating conditions occurring before entering the approaching tunnel.

14. The method of claim 11, wherein the initiation of regeneration is further based on a position of the first vehicle relative to positions of other, second vehicles of the consist, and whether the first vehicle trails any other, second vehicles with an operating engine.

15. The method of claim 14, further comprising shifting load distribution of the first vehicle from a forward one of the other, second vehicles during the particulate filter regeneration to increase an engine load of an engine of the first vehicle to increase exhaust temperature.

16. The method of claim 11, wherein the initiation of regeneration is further based on a grade of the approaching tunnel.

17. The method of claim 11, further comprising determining a time to cool an exhaust treatment system in which the particulate filter is disposed, and determining a position at which to initiate regeneration of the particulate filter further based on the time to cool the exhaust treatment system.

18. A system, comprising: a control module configured for operable deployment on a first rail vehicle of a rail vehicle consist including the first rail vehicle and plural second rail vehicles, the control module configured to:

determine positions of the first rail vehicle and the plural second rail vehicles with respect to a position of an approaching tunnel and with respect to each other;

determine current particulate loads of engine exhaust particulate filters of each of the first rail vehicle and the plural second rail vehicles;

for each of the first rail vehicle and the plural second rail vehicles, determine an estimated regeneration time based on the current particulate load of the vehicle, the position of the vehicle with respect to the position of the approaching tunnel and with respect to the other vehicles, and operating conditions expected along a route leading to an entrance of the approaching tunnel; and for each of the first rail vehicle and the plural second rail vehicles, initiate regeneration of the particulate filter based on a comparison of the estimated regeneration time to an estimated time before the vehicle will enter the approaching tunnel.

19. The system of claim 18, wherein the control module is further configured to generate control signals for adjusting a load distribution among the rail vehicle consist to increase an exhaust temperature in one or more of the vehicles to initiate the regeneration of the one or more particulate filters.

20. A system, comprising:
a control module configured for operable deployment on a vehicle, the control module configured to:
receive data relating to at least one of a position of the vehicle or a tunnel that the vehicle is approaching;
determine if a particulate filter of the vehicle can be regenerated to a desired degree within a selected time before entering the tunnel; and
if the particulate filter of the vehicle can be regenerated to the desired degree within the selected time before entering the tunnel, initiate regeneration of the particulate filter of the vehicle as late as possible before the vehicle enters the tunnel.

* * * * *